No. 683,249. Patented Sept. 24, 1901.
R. B. COCHRAN.
PRINTER'S FURNITURE AND LOCK-UP.
(Application filed Apr. 8, 1901.)

(No Model.)

WITNESSES:
R. Cochran
Chas. B. Buck

INVENTOR
Robert B. Cochran
BY
David E. Law
ATTORNEY

UNITED STATES PATENT OFFICE.

ROBERT B. COCHRAN, OF MIDDLETOWN, NEW YORK, ASSIGNOR TO THE MORGANS AND WILCOX MFG. CO., OF SAME PLACE.

PRINTER'S FURNITURE AND LOCK-UP.

SPECIFICATION forming part of Letters Patent No. 683,249, dated September 24, 1901.

Application filed April 8, 1901. Serial No. 54,916. (No model.)

*To all whom it may concern:*

Be it known that I, ROBERT B. COCHRAN, a citizen of the United States, and a resident of Middletown, in the county of Orange and State of New York, have invented certain new and useful Improvements in Printers' Furniture and Lock-Ups, of which the following is a specification.

My invention relates to an improvement in printers' furniture and lock-ups; and it consists in an extension-bar which may be readily elongated to nearly the desired length and then forcibly extended with a screw.

Figure 1:
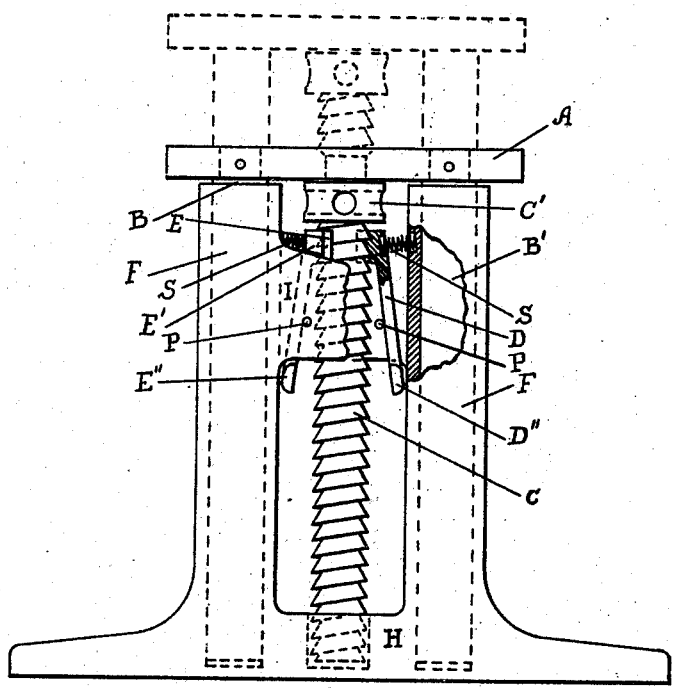
Figure 2:
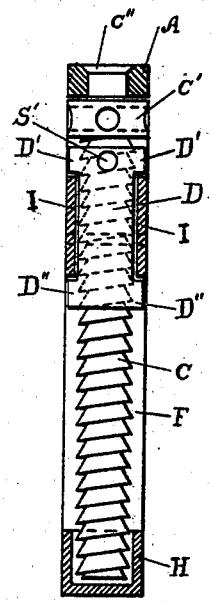

Referring to the accompanying sheet of drawings, in which similar letters refer to similar parts, Figure 1 is a front elevation of my new lock-up with certain portions partly removed; and Fig. 2 is a side elevation of Fig. 1 in section on a medial vertical plane, with, however, certain central parts shown in full.

This device consists principally of two parts, the frame H F F and the head A B B'. The frame consists of the foot H, the two hollow cylindrical members F F, and the two cross-pieces I I. The head consists of the two guides B B', which may be moved longitudinally in and make an easy fit in the hollow members F F, and the yoke A, to which the guides are rigidly attached. A screw C, with a nurled turret-head C', has a cylindrical extension beyond the turret-head, which makes a turning fit in a central hole in the yoke-piece A and the end C'' of which is upset to fill a countersunk part of this hole. When the two parts of my device are in operative position, as illustrated, the screw C passes between the two cross-pieces I I, a portion of one of which is removed in Fig. 1. Also lying between the cross-pieces I I are two dogs or pawls D and E. The head end of each pawl is provided with segmental helical teeth, which are suited to engage with the thread of the screw C, and is also provided with ears D' and E', which rest on the cross-pieces I I and receive the entire downward thrust of the screw when in use. The head end of dog D is shown in section in Fig. 1. The lower or tail ends of these pawls are also provided with ears D'' E'', which serve both to operate the pawls and to prevent their being withdrawn from between the cross-pieces I I. Springs S S are seated in recesses S' and operate between the head of each of the dogs D and E and the adjacent part of the frame and serve to keep the dogs in engagement with the screw. Two pins P P are passed transversely through the chamber made by the cross-pieces I I and are so placed that each may serve as a fulcrum for one of the dogs D E when it is desired to disengage the dogs from the screw by pressing their tail ends nearer together. The upper side of each of the cross-pieces I I is depressed toward its central part, so that the pressure of the screw on the dogs may tend to cause the dogs to make a closer contact with the screw, since the ears D' E' on the head of the dogs rest on these depressed surfaces. The thread of the screw C is preferably of triangular cross-section and is cut so that the beveled part is all on the upper surface, while the lower surface is normal to the axis of the screw. In Fig. 1 an extended position of the head part is shown in dotted lines. To operate this lock-up, it is placed between the objects desired to be forcibly held apart, the foot part H being placed against one of the objects, while the head A is withdrawn until it touches the other object. This is easily done, since the rack form of the screw-thread permits it to pass out between the dogs with little obstruction; but having been extended the dogs so engage with the thread that they prevent its return. Then farther and forcible extension is accomplished by turning the screw with the thumb and finger applied to the turret-head C' or by turning the turret-head by means of a pin inserted in one of its holes. To remove the lock-up, it is first necessary to relieve the pressure by turning the screw in the reverse direction, when a slight pressure exerted by the thumb and finger on the ears D'' E'' on the tails of the dogs to bring them together will serve to turn these dogs about the pins P P and disengage them from the screw-thread, when the head A can be pressed toward the foot H without further resistance. Thus it is seen that the screw C serves the double purpose of a rack and a screw. The whole thrust of the screw is supported by the ears D' E', resting on the cross-pieces I I, and the declension of the upper surfaces of these cross-pieces is such that the thrust of the screw tends to more securely engage the dogs with its thread.

I do not want to be understood as limiting myself to the precise mechanical construction here shown and described.

Having described my invention, what I claim as new, and desire to secure by Letters Patent, is—

1. In a printer's lock-up the combination of a foot part and a head part, a screw journaled in one of said parts, dogs connected to the other of said parts, means for placing the thrust of said screw on said dogs, and inclined surfaces on which said dogs may be supported and on which they may be caused to slide by the thrust of said screw.

2. In a printer's lock-up the combination of a foot part and a head part, a screw journaled in one of said parts, dogs connected to the other of said parts, means for placing the thrust of said screw on said dogs, inclined surfaces on which said dogs may be supported and on which they may be caused to slide into closer engagement with said screw by the thrust of the same, means which may tend to hold said dogs in retractile engagement with said screw, and means for disengaging said dogs from said screw.

3. In a printer's lock-up the combination of a foot part and a head part, a screw journaled in one of said parts, dogs connected to the other of said parts, means for placing the thrust of said screw on said dogs, inclined surfaces on which said dogs may be supported and on which they may be caused to slide by said screw thrust, fulcrums on which said dogs may be rocked to disengage them from said screw, and means for operating said screw.

4. In a printer's lock-up the combination of a head part and a foot part suited to move only longitudinally on each other; a screw journaled in said head part; inclined surfaces on said foot part; dogs, provided with lugs or ears, attached to said foot part in such place and manner that when the two parts are in operative position said screw may lie between said dogs with which the thread may engage, and said lugs may rest on said inclined surfaces, receive the thrust of said screw, and may be thereby moved on said inclined surfaces in such manner that said dogs may be brought in closer engagement with said screw; means for disengaging said dogs from said screw; and means for operating said screw.

5. In a printer's lock-up the combination of a head part and a foot part suited to move only longitudinally on each other; a screw journaled in said head part; inclined surfaces on said foot part; dogs, provided with lugs, loosely attached to said foot part in such place and manner that when the two parts are in operative position said screw may lie between said dogs with which its thread may engage, and said lugs may rest on said inclined surfaces on said foot part and receive the thrust of said screw; an extension on each of said dogs; parts on said foot part suited to serve as a fulcrum for each of said dogs; means for pressing the extensions on said dogs against and rocking them on said fulcrums which may release said dogs from engagement with said screw; and means for operating said screw.

6. In a printer's lock-up the combination of a head part and a foot part suited to move longitudinally on each other; a screw journaled in said head part; dogs, provided with lugs on their heads, other extensions from said heads, and lugs on the lower end of said extensions; a hole in said foot part in which said extensions may lie and be retained by said lugs; fulcrums in said hole against which said extension may rest, said dogs being so placed in said hole that when the two parts are in operative position said screw may lie in said hole between said dogs; means which may tend to keep said dogs in engagement with said screw; and means for operating said screw.

7. In a printer's lock-up the combination of a head part and a foot part suited to move only longitudinally on each other; a screw journaled in said head part; a hole in said foot part in which said screw may lie; V-form surfaces on said foot part at the top of said hole; dogs each having lateral lugs on its head, and an extension downward from said head, and lateral lugs at the lower end of said extension, which may lie on either side of the said screw in engagement therewith with said lateral lugs on said heads resting on said V-surfaces, said extensions lying in said hole and said lugs on said extension projecting laterally beneath the walls of said hole; fulcrums for said extensions which lie between them and said screw; springs operating between said foot part and said dogs which may tend to keep them in engagement with said screw; and means for operating said screw.

8. In a printer's lock-up the combination of a foot part and a head part, said foot part having parallel ways and said head part having parallel guides which may operate in said ways; a screw journaled in said head part; a turret-head on said screw; a hole in said foot part in which said screw may lie; V-form surfaces on said foot part at the top of said hole; dogs, each having lateral lugs on its head, an extension downward from said head, and lateral lugs at the lower end of said extension, which may lie on either side of said screw in engagement therewith with said lateral lugs on said heads resting on said V-surfaces, said extensions lying in said hole, and the lugs on said extensions projecting laterally beneath the walls of said hole; pins across said hole between said extensions and said screw; and springs operating between said foot part and said dogs.

9. In a printer's lock-up the combination between the foot part H having hollow cylindrical extensions F F, and cross-pieces I I; the head part A having guides B B suited to move longitudinally in the hollow extensions F F, the screw C with turret-head C' journaled in a central hole through the head A; the dogs D and E having lateral head-lugs D' D' and E' E', and extensions or tails with lateral lugs D" D" and E" E"; springs S S seated in recesses S' S'; and pins P P, all substantially as and for the purpose described.

Signed at Middletown, in the county of Orange and State of New York, this 4th day of April, A. D. 1901.

ROBERT B. COCHRAN.

Witnesses:
 JOHN McWILLIAMS,
 CHAS. E. GARDNER.